(12) United States Patent
Allen et al.

(10) Patent No.: US 10,766,223 B2
(45) Date of Patent: Sep. 8, 2020

(54) LOW GLOSS LAMINATED ARTICLE

(71) Applicant: 3M INNOVATIVE PROPERTIES COMPANY, St. Paul, MN (US)

(72) Inventors: Richard C. Allen, Lilydale, MN (US); Ellen O. Aeling, Oakdale, MN (US); William J. Bryan, Novato, CA (US); Robert R. Condon, Woodbury, MN (US); David J. Koch, Woodbury, MN (US); John C. Schultz, Afton, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 17 days.

(21) Appl. No.: 15/772,547

(22) PCT Filed: Oct. 28, 2016

(86) PCT No.: PCT/US2016/059305
§ 371 (c)(1),
(2) Date: May 1, 2018

(87) PCT Pub. No.: WO2017/079046
PCT Pub. Date: May 11, 2017

(65) Prior Publication Data
US 2019/0084269 A1    Mar. 21, 2019

Related U.S. Application Data

(60) Provisional application No. 62/249,638, filed on Nov. 2, 2015.

(51) Int. Cl.
  B32B 5/02 (2006.01)
  B32B 27/12 (2006.01)
  (Continued)

(52) U.S. Cl.
  CPC ............... *B32B 5/022* (2013.01); *B32B 5/00* (2013.01); *B32B 5/02* (2013.01); *B32B 5/024* (2013.01);
  (Continued)

(58) Field of Classification Search
  None
  See application file for complete search history.

(56) References Cited

U.S. PATENT DOCUMENTS 4,776,121 A   10/1988  Vicino
4,968,562 A   11/1990  Delgado
(Continued)

FOREIGN PATENT DOCUMENTS

EP  0570515  11/1993
EP  0617708   5/1994
(Continued)

OTHER PUBLICATIONS

Satas, et al., Handbook of Pressure Sensitive Adhesives, 2nd Ed. (Von Nostrand Reinhold) N.Y., 1989) pp. 396-456.
(Continued)

*Primary Examiner* — Jenna L Johnson
(74) *Attorney, Agent, or Firm* — Daniel J. Iden (57) ABSTRACT

A fabric with a laminated adhesive-backed protective layer. The adhesive-backed protective layer has a matte finish that is low gloss and may approximate the fabric itself.

7 Claims, 2 Drawing Sheets (51) Int. Cl.
| | |
|---|---|
| *B32B 27/30* | (2006.01) |
| *B32B 23/04* | (2006.01) |
| *B32B 7/12* | (2006.01) |
| *B32B 7/04* | (2019.01) |
| *B32B 5/00* | (2006.01) |
| *B32B 27/00* | (2006.01) |
| *B32B 7/02* | (2019.01) |
| *B32B 5/24* | (2006.01) |
| *B32B 23/02* | (2006.01) |
| *B32B 7/10* | (2006.01) |
| *B32B 7/00* | (2019.01) |
| *B32B 27/06* | (2006.01) |
| *B32B 27/28* | (2006.01) |
| *B32B 5/22* | (2006.01) |
| *B32B 23/00* | (2006.01) |
| *B32B 23/10* | (2006.01) |
| *B32B 23/20* | (2006.01) |
| *B32B 37/12* | (2006.01) |

(52) U.S. Cl.
CPC ............... *B32B 5/22* (2013.01); *B32B 5/24* (2013.01); *B32B 7/00* (2013.01); *B32B 7/02* (2013.01); *B32B 7/04* (2013.01); *B32B 7/10* (2013.01); *B32B 7/12* (2013.01); *B32B 23/00* (2013.01); *B32B 23/02* (2013.01); *B32B 23/04* (2013.01); *B32B 23/10* (2013.01); *B32B 23/20* (2013.01); *B32B 27/00* (2013.01); *B32B 27/06* (2013.01); *B32B 27/12* (2013.01); *B32B 27/28* (2013.01); *B32B 27/30* (2013.01); *B32B 27/304* (2013.01); *B32B 37/12* (2013.01); *B32B 2250/00* (2013.01); *B32B 2262/00* (2013.01); *B32B 2262/0276* (2013.01); *B32B 2307/40* (2013.01); *B32B 2307/402* (2013.01); *B32B 2307/404* (2013.01); *B32B 2307/408* (2013.01); *B32B 2307/416* (2013.01); *B32B 2307/422* (2013.01); *B32B 2307/50* (2013.01); *B32B 2307/538* (2013.01); *B32B 2307/54* (2013.01); *B32B 2307/71* (2013.01); *B32B 2307/712* (2013.01); *B32B 2307/75* (2013.01); *B32B 2451/00* (2013.01); *B32B 2590/00* (2013.01)

(56) References Cited

U.S. PATENT DOCUMENTS

| | | | |
|---|---|---|---|
| 4,994,322 | A | 2/1991 | Delgado |
| 5,030,498 | A * | 7/1991 | Okada ............... B32B 27/12 |
| | | | 428/99 |
| 5,141,790 | A | 8/1992 | Calhoun |
| 5,296,277 | A | 3/1994 | Wilson |
| 5,362,516 | A | 11/1994 | Wilson |
| 5,674,592 | A | 10/1997 | Clark |
| 5,795,636 | A | 8/1998 | Keller |
| 6,604,309 | B1 * | 8/2003 | Phua .................. B32B 27/12 |
| | | | 40/560 |
| 6,770,324 | B2 | 8/2004 | Hooker |
| 6,953,624 | B2 | 10/2005 | Bacon, Jr. |
| 7,879,419 | B2 | 2/2011 | Stocq |
| 7,972,681 | B2 | 7/2011 | Roys |
| 2008/0075837 | A1 | 3/2008 | Bower |
| 2008/0311349 | A1 * | 12/2008 | Johnson ............. C23C 14/024 |
| | | | 428/172 |
| 2010/0009122 | A1 | 1/2010 | Schlayer |
| 2014/0014009 | A1 | 1/2014 | Crockwell |
| 2014/0141214 | A1 | 5/2014 | Steelman |

FOREIGN PATENT DOCUMENTS

| | | |
|---|---|---|
| JP | H0850452 | 2/1996 |
| JP | 2011-052336 | 3/2011 |
| WO | WO 2006-041362 | 4/2006 |

OTHER PUBLICATIONS

International Search report for PCT International Application No. PCT/US2016/059305 dated Mar. 7, 2017, 5 pages.

* cited by examiner

LOW GLOSS LAMINATED ARTICLE

CROSS REFERENCE TO RELATED APPLICATIONS

This application is a national stage filing under 35 U.S.C. 371 of PCT/US2016/059305, filed Oct. 28, 2016, which claims the benefit of U.S. Provisional Application No. 62/249,638, filed Nov. 2, 2015, the disclosure of which is incorporated by reference in its entirety herein.

BACKGROUND

Digitally printable fabrics have recently seen rapid growth, as fabrics have many perceived advantages over other forms of printable media, such as lower weight (hence lower shipping costs and lighter weight framing devices) and compatibility with a wide range of digital printing technologies. Indeed, even a casual review of most trade shows today will show a nearly complete transition to printed fabric from hard walls and other heavier and more expensive graphics media. There are many printable fabric materials available today. Printable fabrics for indoor applications are wide spread. The range of printable fabrics for outdoor applications is increasing as the market grows.

Most printable fabrics available today are intended for indoor applications and for use with dye sublimation printing technologies. Because of the temperature requirements for dye sublimation, most printable fabrics are polyester based fabrics. The advantage of dye sublimation printing technology is that the color saturation of the printed image is high, and the printed fabric can be easily laundered.

Outdoor durable fabrics have been around since the 1960s for applications such as awnings, outdoor furnishings and marine fabrics, to name a few. One such outdoor durable fabric seller in this space is Glen Raven Inc. of Glen Raven, N.C., offering a wide range of colors and patterns of acrylic fabrics under the brand name of Sunbrella. For customers wanting custom and complex graphics using a wide color palette on an acrylic fabric, the best practice is to print a graphical image onto an adhesive-backed film, over laminate the printed film with a substantially clear protection film, and then to laminate the resulting film stack to the acrylic fabric. One such system is known as SGS or the Sunbrella Graphics System. Customers would prefer to digitally (ink jet) print directly onto the acrylic fabric; however, there are challenges associated with this practice. First, the surface of some acrylic fabrics often has loose fibers which may clog ink jet printer nozzles. Secondly, digitally printable inks are often not as UV stable as the acrylic fabric itself. Thus, a protective coating or film is required to preclude ink fade of digitally printed acrylic fabrics.

Unlike acrylic fabrics, a disadvantage of many polyester fabrics is the fact that they can degrade in the presence of ultraviolet light and high levels of moisture and humidity, characteristic of outdoor environments. Another disadvantage of many printable polyester fabrics intended for outdoor use is the lack of water repellency, a requirement to keep the fabric from becoming too heavy in the rain as the fabric may tear in the presence of high winds and other stresses. Another challenge of many water repellent polyester fabrics is that the chemistry used to infer water repellency reduces the surface tension of the fabric surface thus reducing print quality and/or ink adhesion. Yet another disadvantage of some polyester fabrics is that they are not flame retardant, as is required for certain regulated applications.

SUMMARY

A low gloss fabric-based graphic film comprising a printed fabric film adhesively coupled to an adhesive-backed clear, protective overlaminate. The overlaminate, applied using methods described herein, may significantly decrease its pre-application gloss levels during the application process, and thus the finished article may achieve a look, in some embodiments, that approximates the printed fabric without the protective overlaminate.

DETAILED DESCRIPTION

Outdoor fabrics require durability enhancing modifications to make them practical for many applications, particularly when printed for outdoor signage or other aesthetic purposes (e.g., awnings having digitally printed graphics). Such durability enhancements may include coatings or overlaminates, which are designed to reduce the effect of sunlight, in particular UV light, which may bleach the printed graphics and/or break down the underlying fabric over time.

The choice of ink is also important when the graphic is expected to be exposed to sunlight. Unfortunately, even the most stable digitally (ink jet) printable inks will eventually fade in the presence of UV light. As many outdoor, printed fabric installations are expected to have lifetimes of five or more years, additional protection is required to maintain hue, saturation and contrast over the specified lifetime.

Additional layers may be added to protect the printed inks and fabric from the damaging effects of weather and sunlight, to various degrees of efficacy. For example, protective coatings can be applied to printed fabric installations. Another approach is to apply a substantially clear overlaminate film onto the printed fabric. As compared with a protective coating, which is often sprayed onto a fabric, overlaminate films often provide improved durability and water resistance, thus extending the life of the printed fabric more effectively than coatings.

Over-laminate films are well known in the commercial graphics industry and are widely used to protect printed graphics from ink fade. However, when such over-laminate films are applied to fabrics, many users complain that the final construction no longer has a visual aesthetic associated with fabric. Users suggest that the over-laminated printed fabric looks "plasticy," or that it "no longer looks like fabric."

A new over-laminated fabric, and method of manufacturing the same, has been discovered. The resulting construction achieves, in some embodiments, an appearance or aesthetic that approximates what many refer to as a fabric look, but it actually includes an over laminated protective film which until now was synonymous with a plastic-like appearance. This look is achieved by a new process of laminating a protective, light transmissive film layer onto the printed fabric, in such a way that the gloss associated with the film layer is reduced to that which is, in some embodiments, lower than the gloss level of the light transmissive film prior to application, and reduced to a level that is in some embodiments comparable to the gloss level of the fabric itself. Similarly, in some embodiments, the resulting construction achieved by the new process may increase the surface roughness of the top most surface such that it approximates the surface roughness of the fabric prior to lamination. In some embodiments, the surface roughness of the light transmissive film layer may increase, per the method described herein, by at least 300%. In some embodiments, the surface roughness of the to-be-outward facing major side of the light transmissive film layer initially has a value of at least 2. After application per the methods described herein, this value may increase in some embodiments to at least 10. All surface roughness measurements referenced herein are measured according to the test method described in the Examples section, below, unless otherwise noted.

Figure 1:
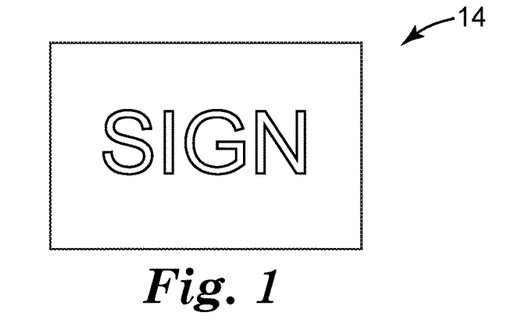
FIG. 1 is a drawing of a sign.

FIG. 1 is a picture of fabric-based graphic sheet cut from a low gloss fabric-based graphic film. Fabric-based graphic sheet 14 comprises a polyester-based woven fabric, printed with the word "SIGN", and a light transmissive protective overlaminate film, through which an observer can see the wording. Polyester-based woven fabric films are commercially available from a number of manufacturers.

Fabric-based sheet 14 includes a printed graphic image of some kind, usually printed directly onto a fabric layer of the construction, though such printing is not necessary and depends on the application. In the embodiment shown in FIG. 1, fabric-based sheet includes printed thereon the word "SIGN". In practice, such printed graphic image would include colorful advertising content and the like. The printed graphic image may be printed upon the fabric using known techniques, such as UV or latex printing or even dye sublimation printing, all of which use piezoelectric or other forms of digital (ink jet) printing technologies. Specialized inks may be printed onto a liner and then transferred to the fabric, or the ink may be printed directly onto the fabric itself.

Figure 2:
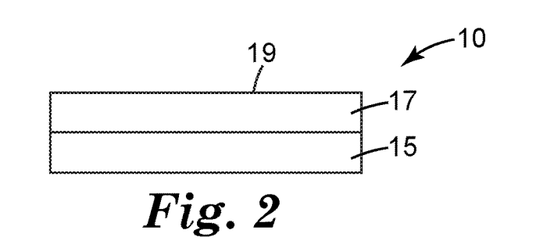
FIG. 2 is a profile view of the layers of the sign of FIG. 1.

FIG. 2 is a profile view showing the layer stack of the fabric-based graphic sheet shown in FIG. 1. Fabric layer 15 comprises a woven fabric. In one preferred embodiment, fabric layer 15 is a polyester woven fabric. Polyester woven fabrics suitable for outdoor use are available from several companies. For example, outdoor durable polyester fabrics are available from Glen Raven Inc. (Glen Raven, N.C.) under the brand name, Firesist, and Safety Components Inc. (Greenville, S.C.) under the brand name, WeatherMax. 3M Company (St Paul, Minn.) also offers an outdoor durable fabric.

Light transmissive film layer 17 is coupled to the top major surface of fabric layer 15 by an adhesive layer, which is not shown in FIG. 2. The adhesive layer may comprise any suitable adhesive. Many companies supply adhesives and the choice of adhesives depends upon many different issues. Adhesives can be selected from a variety of conventional adhesive formulations. Nonlimiting examples of adhesives include pressure sensitive adhesives, hot melt or heat activated adhesives that are pressure sensitive at the time of application such as pressure sensitive adhesives disclosed in U.S. Pat. No. 4,994,322 (Delgado et al.); U.S. Pat. No. 4,968,562 (Delgado); EPO Publication 0 570 515; EPO Publication 0 617 708; pressure sensitive adhesives disclosed in U.S. Pat. Nos. 5,296,277 and 5,362,516 (both Wilson et al.) and U.S. Pat. No. 5,141,790 (Calhoun et al.) and U.S. patent application Ser. No. 08/559,037 (Keller et al.), and any other type of suitable pressure sensitive adhesive disclosed in Satas, et al., Handbook of Pressure Sensitive Adhesives, 2nd Ed. (Von Nostrand Reinhold, N.Y., 1989).

In general, pressure sensitive adhesives may be melt extruded onto a liner or other surface, or they may be coated out of aqueous or non-aqueous diluents. Adhesives may also be characterized by their stiffness, depending upon how much viscous flow is desired during and after application.

Further intervening layers between fabric layer 15 and light transmissive film layer 17 are possible. Such layers might include further film layers, such as cut lettering or graphics, or further printed film layers, adhesive layers, protective coatings, and the like. Light transmissive film layer 17 is a protective layer, and may be designed to include UV blockers or otherwise be designed for improved durability in intended applications.

Light transmissive film layer 17 comprises in one embodiment a light transmissive polyvinylchloride-based film. In one embodiment, the light transmissive film layer comprises a low gloss, or matte, film. Other film chemistries are possible, but whatever the chemistry, the light transmissive film later should begin to soften at a temperature below the softening temperature of polyester. In addition to softening point, in some applications it may be preferred to have limited recovery of strain following the imposed stress. In mechanics, this recovery is referred to as creep. If the material does not recover at all following a mechanical strain, it can be said to exhibit dead set. For the light transmissive or protection film to take on a look roughly equivalent to fabric, the protection film of the present invention plastically deforms, roughly replicating the texture of the underlying fabric, exhibiting little or no strain recovery following the imposition of compressive stress. Light transmissive film layer 17 may be any suitable film, such as PVC-based films, or polyolefin films, or thermoplastic polyurethane and cellulose ester films as described in US Patent Application Publication Nos. 2014/0141214 "Graphic Article"(Steelman and Lyon) and 2014/014009 "Graphic Aritcle" (also Steelman and Lyon).

Before application according to the method described below, the top surface (that is, the surface not adhesively interfacing with the top surface of the fabric layer) of light transmissive film layer 17 may have relative luminous reflectance factors when measured on their original liners in the range of 2 to 100, preferably in the range of 2 to 50, more preferably in the range of 2 to 30. In certain embodiments, the relative luminous reflectance factor of the light transmissive film layer, before application to the fabric substrate as described herein, is "low gloss" meaning that the light transmissive film layer has a relative luminous reflectance factor of less than 30. Example values of such values for low gloss light transmissive film layers include 25, 20, 15, 10, and even lower. After application according to the method described below, such top surface of the light transmissive film layer may in some embodiments have the relative luminous reflectance factor of less than 10, preferably less than 9, more preferably less than 8. Aside from an absolute value of relative luminous reflectance factor, it is preferred that the relative luminous reflectance factor of the protective light transmissive film layer 17 decrease per the application process described herein, relative to the value measured while on its original line—that is, before application. In other words, the relative luminous reflectance factor of the top surface of the light transmissive film layer 17 has a first value before it is applied to the fabric, and a second value after it is applied to the fabric per the methods described herein. The $2^{nd}$ value is lower than the first. It is more preferred that the relative luminous reflectance factor decrease by more than 20%, more preferably more than about 40%, most preferably more than about 50%. (Note, all relative luminous reflectance measurements referenced herein are measured according to ASTM D523-14, "Standard Test Method for Specular Gloss", and the term "relative luminous reflectance factor" and "gloss" are herein used interchangeably.)

Without intending to be limited by theory, a relative luminous reflectance factor of the light transmissive film lower than its value measured on its original liner is generally associated with the introduction of additional facets in the light transmissive film layer 17, which serve to re-direct or scatter light from its original path away from the detector. It is generally accepted that fabric exhibits a low relative luminous reflectance factor because of the minute roughness of the individual fibers wound into yarn and the associated non-planar trajectory of the yarns in an otherwise planar appearing fabric. To the degree the light transmissive film can, per the application process, to some degree replicate or adopt the surface topology of the underlying fabric, it should appear increasingly fabric like and have an increasingly lower relative luminous reflectance factor.

Note that the introduction of facets and the associated reduction in relative luminous reflectance factor alone will not necessarily result in a fabric appearance. The periodicity of a weave in an outdoor fabric is usually measured in the hundreds of micrometers. If one were to coat or otherwise create a surface that largely replicated the two-dimensional weave pattern, but where said surface was otherwise smooth on micrometer and sub-micrometer levels, then one may perceive what is commonly referred to as glitter or sparkle. Sparkle is an aspect of the appearance of a material that seems to emit or reveal tiny bright points of light that are strikingly brighter than their immediate surround and are made more apparent when a minimum of one of the contributors (e.g. a light source) is moved. This phenomena can be understood by those skilled in metallic paints, where sparkle is a desirable effect, both the size and the surface of the scattering facet are important. Therefore, it is preferred that the as-received light transmissive film layer have a relatively low gloss, as mentioned above, so as not to result in high levels of sparkle in the final laminate construction.

In that most people do not normally imagine fabric as having sparkle, then it is preferred that constructions of the present invention have low sparkle, preferably less than 20, more preferably less than 15, most preferably less than 10.

The construction of FIG. 2, and in particular the reduced reflectance factor of the upper surface 19 of the resulting construction 10, is achieved by pressing the light transmissive film 17 onto and, to a degree, into the variable topographical surface of fabric layer 15 while minimizing excessive heating of the light transmissive film layer. It is preferred to first heat the fabric layer 15 to between about 85° C. and 120° C., while maintaining the light transmissive film layer 17 to less than about 40° C., until the light transmissive film layer enters the nip, where heat from the optionally printed fabric layer 15 transfers to first to the adhesive layer and then to the light transmissive film itself. The time that the materials reside in the nip is dependent upon roll durometer and on roll speed. The time required for the adhesive layer and light transmissive film substrate layer to heat is dependent upon the respective heat transfer coefficients. The art generally recommends overlaminate films be applied with the cold roll method, where the nip rollers in a roll-to-roll laminator should not exceed 40° C. to avoid stretching of light transmissive film layer and the possibility of curl in the final graphic construction; thus the invention herein involves a new method whereby at one of the rollers may be, in some application embodiments, well above 40° C. Excess unwind tensions of the light transmissive film layer during the lamination process may also result in curl of the final product.

At a high level, the application of the present invention method involves bringing the light transmissive film layer into contact with the fabric layer in the presence of heat. In one particular embodiment, the fabric is heated. The light transmissive film layer is generally kept cool enough so as to not deform or cause installation issues. The heated fabric layer causes the light transmissive film layer to soften when the two materials are brought into contact (often in the presence of an additional adhesive), and along with the pressure, causes the light transmissive layer to plastically deform to some degree, and thereby accommodate the variable topography of the fabric layer. The net effect of this process causes the gloss level of the upper surface 19 of light transmissive film layer 17 to be reduced. It is important that the temperature of the upper surface 19 not get too hot at any particular nip pressure, else the matte surface of the as-received light transmissive film layer will melt and adopt the texture of the nip roll surface.

Figure 3:
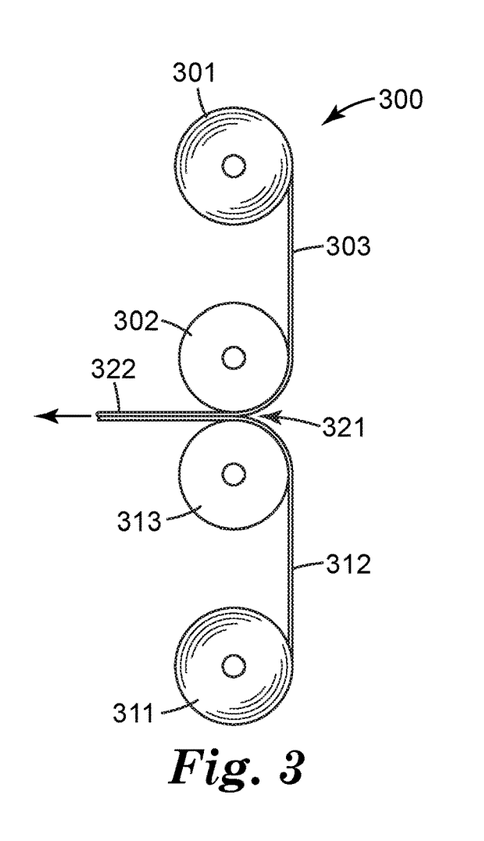
FIG. 3 is an illustration of a continuous, roll-to-roll laminator.

FIG. 3 is an illustration of a continuous, roll-to-roll laminator. The roll-to-roll laminator 300 comprises an unwind station 301 for the light transmission film and an unwind station 311 for the printed fabric. The unwound light transmissive film contacts at least a portion of unheated nip roller 302. The unwound fabric contacts at least a portion of heated nip roller 313. The printed surface of the fabric 312 meets the adhesive layer 303 on the second major face of the light transmission film in the nip 321. The laminated fabric-based graphic film 322 is then collected.

As shown in FIG. 3, this method may be incorporated into a roll-to-roll manufacturing process, where the fabric is wrapped around at least a portion, preferably at least about 90° of the circumference of a heated nip roll. Doing so will assure the fabric actually approach that of the heated roll and may thus provide for increases in line speed. It is also preferred that the light transmissive film wrap at least a portion of the circumference of a unheated nip roll to assure uniform tension across the film as it enters the nip. Doing so will help avoid curl as well as wrinkles and other lamination defects.

Figure 4:
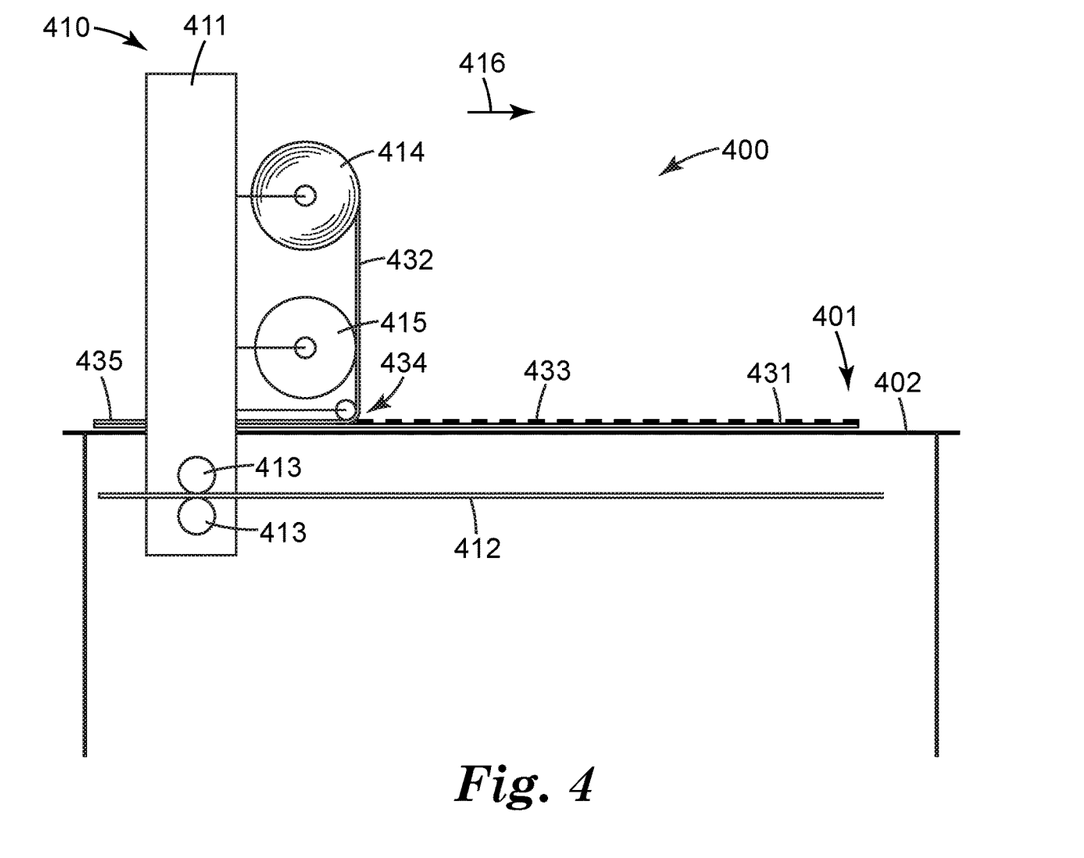
FIG. 4 is an illustration of a flatbed laminator.

An alternative to a roll-to-roll lamination process, flatbed lamination can also be used to adhere the light transmissive layer 17 to the optionally printed surface of fabric layer 15. A flatbed laminator system comprises a base and upper carriage frame, the latter capable of translating on a set of linear bearings along the top and length of the base. In practice, the optionally printed fabric is placed onto the base with the printed surface up; the light transmissive layer is held by the translatable carriage frame where upon being unwound, it enters a nip to adhere light transmissive layer 17 to the printed surface of fabric layer 15.

FIG. 4 is an illustration of a flatbed laminator. A flatbed laminator 400 comprises a base 401 and a carriage 410. The base comprises a surface 402 onto the optionally printed fabric 431 is placed. The carriage 410 comprising an arm 411 attached to the base 401 via a rail 412 and linear bearings 413 travels in the direction 416. The carriage arm 411 also comprises an unwind station 414 and an optionally heated roller 415. In operation, the light transmissive film having an adhesive layer 432 and the printed fabric 431 having a first major face onto which is printed a graphical image 433 are then adhesively coupled at the nip 434 as the carriage arm 411 travels down the length of the base 401 in the direction 416. The laminated fabric-based graphic film 435 is collected. The optionally printed fabric 431 is heated by means not shown comprising one or more irradiative, convective and/or conductive processes.

The printed fabric in a flatbed lamination setup is substantially stationary and laid horizontally on laminator bed. The carriage frame system supports a lamination roller whose axis of rotation is normal to the direction of travel of the carriage frame system. The lamination roller may optionally be heated and is supported by air cylinders at both ends of said lamination roller. The air cylinders act to force the roller onto the flat bed creating a "line of contact" or "nip". The carriage frame supports the light transmissive film whereby the film can be substantially wrapped around the alternatively heated roller and bringing the heated light transmissive film into contact with the printed fabric at the nip. The carriage frame and light transmissive film are then displaced moving the nip zone, preferably at a speed between 30 and 100 centimeters per minute, thus laminating the film onto the fabric. The lamination roll temperature can be adjustable by means of a temperature controller. Heat is thus transferred into the light transmissive film layer 17 when contacted to the heated fabric.

In addition to heating the light transmissive layer 17, the fabric layer 15 can also be heated prior to or during the lamination process. Methods of heating the fabric layer 15 may be irradiative, convective or conductive. For example, heating may be accomplished by any one method or in a combination of methods. Methods may include processes such as infrared heaters, hot air or heated surfaces onto one or both major surfaces of the fabric. By adjusting the temperature of the light transmission film and fabric layer, replication of fabric surface topology to the top most surface 19 of the light transmissive layer 17 may be optimized.

EXAMPLES

Polyester fabrics were printed and laminated to protective films. The fabrics were tested for gloss, surface roughness, sparkle and durability. These examples are merely for illustrative purposes only and are not meant to be limiting on the scope of the appended claims.

micro-TRI-gloss meter; values measured at 60°. All samples were placed on ten sheets of white paper to standardize reflections that may depend upon the back most surface. The gloss for as-received adhesive backed protection films were measured while still on their original liners, the liner placed on ten sheets of white paper to standardize reflections that may depend upon the back most surface. The term Percent Gloss is herein defined as the ratio of the difference of the measured gloss following lamination minus the gloss of the protection film prior to lamination divided by the gloss of the protection film prior to lamination, and is reported as a percentage. A negative value implies the gloss decreased.

Sparkle Index

Sparkle Index is defined by ASTM E284-13b and was measured in accordance with a preliminary ASTM standard using a commercially available piece of equipment, the BYK-mac multi-angle spectrophotometer. Reported values are the Sparkle Index measured at 15°. A Sparkle Index less than approximately 10 suggests that a viewer will perceive little or no specular reflections or "glitter" off of the tested material when it is viewed, for example, under direct sun light.

The term Percent Sparkle is herein defined as the ratio of the difference of the measured Sparkle Index of the laminate construction minus the Sparkle Index of the fabric prior to lamination divided by the Sparkle Index of the fabric prior to lamination, and is reported as a percentage. A negative value implies the Sparkle Index decreased.

Surface Roughness

The surface roughness was measured in accordance with ASTM D7127-13. The peak to valley height, Rz, and the arithmetic average, Ra, were measured using a Keyence 3D Laser Scanning Confocal Microscope Model VK-X260K. A 10× objective was used to assure the scan would encompass an area at least a full weave period of the fabric. In addition to calculating the surface roughness, a topological map was created showing the pattern of the upper most surface of fabrics, films and laminate constructions. The term % Ra is herein defined as the ratio of the difference of the measured Ra following lamination minus the Ra of the as-received protection film measured on its liner divided by the Ra of the as-received protection film measured on its liner, and is reported as a percentage. A positive value implies the surface roughness increased.

TABLE 1

Materials Studied

| Abbreviation | Description |
| --- | --- |
| FAB 1 | Polyester Fabric available from 3M Company, St. Paul, MN as Printable Fabric 9100. |
| FAB 2 | Polyester Fabric with a urethane acrylic coating available from Glen Raven, Inc., Glen Raven, NC as FIRESIST HUV. |
| Film 1 | Film available from 3M Company, St. Paul, MN as 3M ENVISION Gloss Overlaminate Film 8548G. |
| Film 2 | Film available from 3M Company, St. Paul, MN as 3M ENVISION Luster Wrap Overlaminate 8549L. |
| Film 3 | Film available from 3M Company, St. Paul, MN as 3M SCOTCHCAL Matte Graphic Protection Overlaminate 3660M. |
| Film 4 | Film available from 3M Company, St. Paul, MN as 3M SCOTCHCAL Ultra-Matte Overlaminate 8915 Transparent |
| Film 5 | Film available from 3M Company, St. Paul, MN as 3M SCOTCHCAL Ultra-Matte Overlaminate 9025 |

Test Methods

Relative Luminous Reflectance Factor

Relative Luminous Reflectance Factor was measured in accordance with ASTM D523-14 using a BYK Gardiner Accelerated Aging To determine long term stability of outdoor printed graphics, properties will be evaluated following exposure to accelerated aging. Specifically, aging will consist of approximately 7.8 MJ per square meter of ultraviolet light (measured at 340 nm) at a constant temperature of 47° C. and saturated humidity environment, all in accordance with ASTM G155-13. A material following accelerated aging will be defined as outdoor durable if the ratio of the measured tensile strength following accelerated aging divided by the tensile strength prior to aging is at least about 50%.

Tensile Strength

Tensile strengths were measured in accordance with the Grab Test Procedure of ASTM D751-06 (2011). Percent tensile strength is the ratio of the measured tensile strength following accelerated aging divided by the tensile strength prior to aging, reported as a percentage. Tensile strengths were measured in the down web direction.

Flame Resistance was measured in accordance with NFPA 701 Method 1.

Spray Ratings were measured in accordance with AATCC Test Method 22-2014.

Process Description Fabrics when printed used an efi VUTEK GS3250LX Pro printer (efi Corp. Fremont, Calif.) and 3M SUPERFLEX magenta ink (3M Company, St. Paul, Minn.). Ink was jetted directly onto the fabric without any additional treatment or surface modification.

A roll to roll laminator or a platen press was used to laminate fabrics and protection films together.

The platen press was a Hix HT-400 (Hix Corporation, Pittsburg, KS) and is typical of the type used to heat laminate decals and the like to fabrics. The temperature of the heated platen was approximately 100° C., and the time of lamination was approximately 30 seconds.

For larger samples and depending upon the sample size, an Orca I or an Orca III roll to roll laminator was used (GBC Pro-Tech De Forest Wis.). For all examples, the speed was 30 cm per minute and the pressure on the regulator was either 30 psi or 80 psi. Unless otherwise specified, the regulator pressure was 80 psi. The top rubber roll was in direct contact with the light transmissive film, and the bottom rubber roll was in direct contact with the unprinted side of the optionally printed fabric. The temperature of the top and bottom rolls were independently controlled. The roll in contact with the optionally printed fabric was heated; the specific values of temperature are indicated in the tables. The roll in contact with the light transmissive film was not actively heated, but did increase from room temperature to a maximum of about 38° C. for the highest heated roll temperature.

Comparative Example C1

Surface Roughness and Gloss were measured for the fabric FAB 1. The gloss was 2.9. The surface roughness Rz was 263 micrometers, and surface roughness Ra was 28.7 micrometers. A surface topology map of the surface topology (not shown) suggest the under- and over-lapping yarns typical of a plain weave fabric.

Comparative Example C1 was also tested for flame resistance; it passed the criteria for NFPA 701 Method 1 and Method 2. The spray rating was 80.

Comparative Example C2

The gloss for FAB 2 was 3.1, and is similar to that for FAB 1. FAB 2 is advertised as compliant with NFPA 701 Methods 1 and 2.

Comparative Examples C3 to C7

Surface roughness and gloss were measured for Films 1 to 5. The values are reported in Table 2.

Surface topology maps (not shown) suggest a relatively featureless surface topology, the latter being slightly rougher than the former, typical of glossy or near glossy textures.

TABLE 2

| Comparative Example | Sample | Gloss | Rz [um] | Ra [um] |
|---|---|---|---|---|
| C1 | FAB 1 | 2.9 | 263 | 28.7 |
| C2 | FAB 2 | 3.1 | — | — |
| C3 | Film 1 | 99.3 | 10 | 0.7 |
| C4 | Film 2 | 68.3 | — | 1.9 |
| C5 | Film 3 | 20.5 | 56 | 4.1 |
| C6 | Film 4 | 6.7 | 35 | 2.7 |
| C7 | Film 5 | 6.6 | 33 | 2.7 |

Comparative Examples C8 to C10

Samples of FAB 1 were laminated to Films 3, 4 and 5 using a platen press. The temperature of the heated platen was approximately 100° C., and the time of lamination was approximately 30 seconds. Gloss values are reported in Table 3. Increases in gloss are likely due to an air interface between the adhesive and the fabric.

TABLE 3

| Comparative Example | Sample | Gloss | % Gloss |
|---|---|---|---|
| C8 | Film 3 | 21.8 | +6% |
| C9 | Film 4 | 8.4 | +25% |
| C10 | Film 5 | 8.5 | +29% |

Comparative Examples C11 to C15

A sample of FAB 1 was printed with 100% density of magenta ink, and is designated Comparative Example C11. The values of gloss, surface roughness and Sparkle are reported in Table 4.

Comparative Example C12 is Comparative Example C11 laminated to Film 1 using an Orca III laminator. The temperature of the heated laminator roll was 38° C., and the lamination speed of 30 cm/minute. Characterization values are shown in Table 4. The gloss decreased and the surface roughness increased relative to Comparative Example C3. However, when viewed under directional lighting, specular reflections off the laminate construction were readily visible. The Sparkle Index for Comparative Example C12 was greater than Comparative Example C11.

Comparative Example C13 was prepared in a manner similar to Comparative Example C12, except the temperature of the lamination was increased to about 94° C. The gloss decreased and the surface roughness increased relative to Comparative Example C12. However, specular reflections were still visible as evidenced by a high value of Sparkle.

Comparative Example C14 was prepared in a manner similar to Comparative Example C12, except the protection film was Film 2. The results were similar to Comparative Example C12.

Comparative Example C15 was prepared in a manner similar to Comparative Example C14, except the temperature of the lamination was increased to about 94° C. The resultant surface properties were similar to Comparative Example C12.

TABLE 4

| Example | Protection Film | Lamination Temperature | Gloss | % Gloss | Ra (um) | % Ra | Sparkle Index | % Sparkle |
|---|---|---|---|---|---|---|---|---|
| C11 | — | — | 1.3 | — | 32.1 | — | 6.4 | — |
| C12 | Film 1 | 38° C. | 33.2 | −67% | 9.5 | 1350% | 39.1 | +510% |
| C13 | Film 1 | 94° C. | 5.6 | −94% | 17.2 | 2450% | 29.6 | +360% |
| C14 | Film 2 | 38° C. | 38.8 | −43% | 10.1 | 530% | 38.0 | +490% |
| C15 | Film 2 | 94° C. | 3.8 | −94% | 20.1 | 1060% | 21.0 | +230% |

Examples E1 and E2

Example E1 was prepared in a manner similar to Comparative Example C14, except the protection film was Film 3. Properties are summarized in Table 5. Example E1 shows both a large decrease in gloss and a large increase in surface roughness, and Sparkle was substantially unchanged relative to Comparative Example C11. The two-dimensional periodicity of the embossed pattern on the top most surface of the laminate construction resembles a two-dimensional sine-wave, whose periodicity is the same as the underlying fabric and whose amplitude is approximated by the peak to valley surface roughness. Rz for Example E1 is more than two times the nominal ~75 micrometer thickness of the as-received Film 3, which implies plastic deformation of Film 3 during lamination.

Example E2 was prepared in a manner similar to Example 1, except the protection film was Film 4. In addition to a decrease in gloss and an increase in surface roughness, Sparkle was measured at roughly zero, meaning that all reflections are diffuse.

TABLE 5

| Ex. | Protection Film | Lamination Temperature | Gloss | Gloss Reduction | Rz (um) | Ra (um) | % Ra | Sparkle Index | % Sparkle |
|---|---|---|---|---|---|---|---|---|---|
| E1 | Film 3 | 94° C. | 3 | −85% | 172 | 24.1 | 590% | 6.2 | −3% |
| E2 | Film 4 | 94° C. | 2.5 | −63% | 146 | 16.5 | 610% | 0 | −100% |

Examples E3 to E6

The purpose of Examples E3 to E6 is to explore the breadth of the lamination process window.

Unprinted samples of FAB1 were laminated to Film 5 using an Orca I. Lamination pressure and temperature of the heated roll were varied as described in Table 6. Gloss and surface roughness are reported.

TABLE 6

| Example | Lamination Pressure | Lamination Temperature | Gloss | % Gloss | Rz (um) | Ra (um) | % Ra |
|---|---|---|---|---|---|---|---|
| E3 | 30 PSI | 92° C. | 5.6 | −60% | 146 | 12.0 | 445% |
| E4 | 80 PSI | 92° C. | 4.9 | −65% | 132 | 12.7 | 470% |
| E5 | 80 PSI | 105° C. | 4.7 | −67% | 106 | 12.3 | 455% |
| E6 | 80 PSI | 112° C. | 4.8 | −66% | 97 | 10.7 | 400% |

Accelerated Aging

To determine long term stability for outdoor printed graphics, the tensile strength was evaluated following accelerated aging. A material following accelerated aging maintaining at least about 50% of its initial tensile strength will be defined as outdoor durable.

Comparative Examples C1 and C2 and Examples E1 and E4 were aged and the tensile strengths were measured before and after accelerated aging. Tensile strengths are reported in Table 7.

TABLE 7

| (Comparative) Example | Fabric | UV Dose [MJ/sqm] | % Tensile Strength |
|---|---|---|---|
| C1 | FAB 1 | 7.0 | 7% |
| C2 | FAB 2 | 4.7 | 40% |
| E1 | FAB 1 | 7.8 | 60% |
| E4 | FAB 1 | 4.7 | 74% |

Comparative Examples C1 and C2 show FAB 1 and FAB 2 do not meet the criterion for outdoor durability.

Example E1 meets the criteria for outdoor durability. Example E1 had a tensile strength of 69% after 4.7 MJ/sqm.

At the time of this writing, the UV dose of Example E4 had not yet reached the critical value of 7.8 MJ/sqm dose. The tensile strength of Example E4 was approximately the same as Example El following 4.7 MJ/sqm dose. Therefore, it is assumed Example E4 will similarly maintain at least 50% tensile strength following exposure to 7.8 MJ/sqm dose, and will thus meet the criteria for outdoor durability.

The invention claimed is:

1. A low gloss fabric-based graphic film, comprising:
   a printed woven fabric layer having first and second major sides;
   a low gloss light transmissive film layer having first and second major sides, its second major side adhesively coupled to the first major side of the printed woven fabric layer;
   wherein the first major side of the light transmissive film layer has a relative luminous reflectance factor that is at least 50% lower than the light transmissive film layer's luminous reflectance factor before adhesive coupling to the first major side of the printed fabric; and,
   wherein the luminous reflectance factors are measured according to ASTM D523-14 at 60°; and
   wherein the first major side of the light transmissive film layer has a sparkle index of less than 20,
   wherein the sparkle index is measured in accordance with ASTM E284-13b.

2. The low gloss fabric-based graphic film of claim 1, wherein low gloss, when used in reference to the light transmissive film layer, comprises a luminous reflectance factor of its first major side less than 20.

3. The low gloss fabric-based graphic film of claim 1, wherein the fabric layer comprises a polyester-based fabric.

4. The low gloss fabric-based graphic film of claim 1, wherein the first major side of the light transmissive film layer has an arithmetic surface roughness value, Ra, of at least 10 following adhesive coupling.

5. The low gloss fabric-based graphic film of claim 1, wherein the light wherein the light transmissive film layer, before adhesive coupling to the first major side of the printed fabric, has a relative luminous reflectance factor of less than 8.

6. The low gloss fabric-based graphic film of claim 1, wherein the light transmissive film layer comprises a polyvinylchloride-based film.

7. The low gloss fabric-based graphic film of claim 1, wherein the light transmissive film layer comprises a cellulose ester film.

* * * * *